Figure 4:
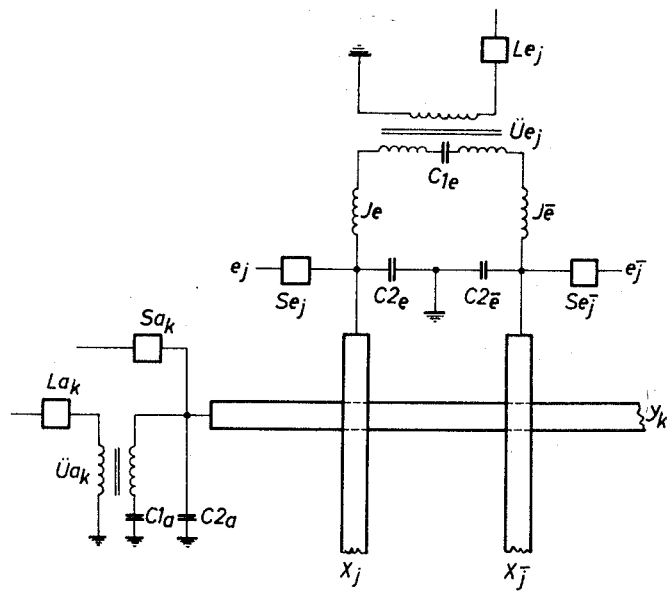

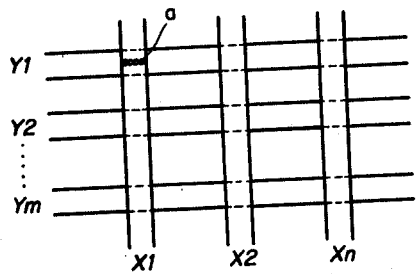
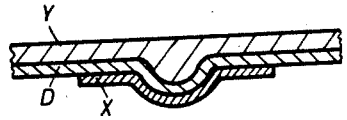
Fig. 1
Fig. 1a
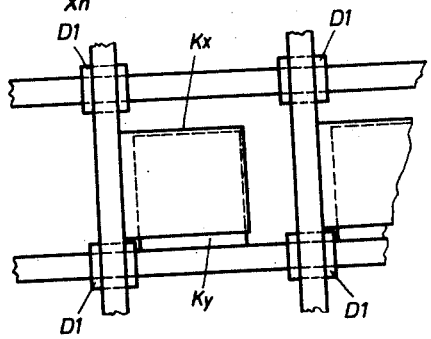
Fig. 2
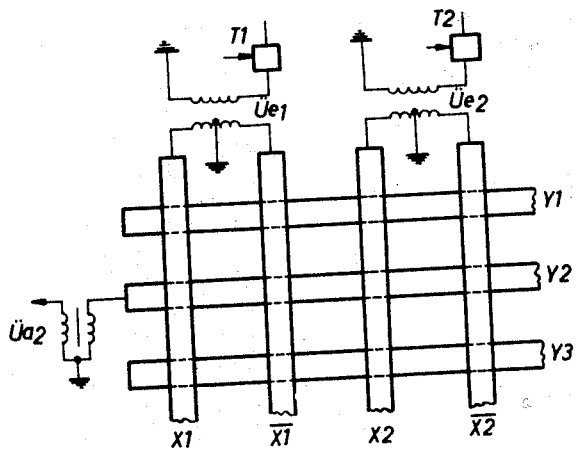
Fig. 3
INVENTORS
KARL STEINBUCH
HANS REINER 3,174,134
ELECTRIC TRANSLATOR OF THE MATRIX TYPE COMPRISING A COUPLING CAPACITOR CAPABLE OF HAVING ONE OF A PLURALITY OF POSSIBLE VALVES CONNECTED BETWEEN EACH ROW AND COLUMN WIRE
Karl Steinbuch, Ettlingen, and Hans Reiner, Leonberg, Germany, assignors to International Standard Electric Corporation, New York, N.Y., a corporation of Delaware
Filed Jan. 17, 1962, Ser. No. 171,551
Claims priority, application Germany, Jan. 20, 1961, St 17,370
20 Claims. (Cl. 340—166)

The present invention relates to an electric translator, the design of which is based on the matrix principle, comprising a coupling capacitor connected between each row and column wire. Electric translators wherein capacitors $C=C_0$ or $C\approx 0$ are connected at the crossover points of row and column conductors, are known per se. As a rule, the feeding-in of the information, that is, the coupling of capacitors between row and column crosspoint conductors which are necessary for the translation, is effected mechanically, e.g. by soldering, by selective application conductive coatings, or the like.

In contradistinction to these conventional types of "matrix translators," the input of information is effected in accordance with the present invention, by electrical means. The general idea of invention consists in that capacitors of equal or approximately equal capacity are provided at all intersecting points, and in that the translating conditions are established in that at those intersecting points where a lower capacitance value is required to exist between the column and the row conductors, the respective capacitors are brought to the desired capacitance value by a burning out process in which coatings on the said capacitors are incrementally destroyed by selective application thereto of coincident row and column voltages.

Thus, the invention utilizes the well-known self-healing effect associated with metallized-paper, metallized-foil, or vaporizing capacitors, in which both the dielectric layer and the metal coatings constituting the capacitor plates are produced by evaporation, and in which the dielectric experiences breakdown upon application thereto of a voltage exceeding a given voltage value and subsequently recovers. With sufficiently high capacity, or a suitably selected external circuit, and with a suitable vaporizing method for producing the metal coating, a small part of the metal coating is incrementally burnt away upon each occurrence of a dielectric breakdown; in this way the breakdown is allowed to heal. This healing, however, is accompanied by a reduction of the capacitance value. In this case the reduction is utilized in a positive sense. Accordingly, by applying a voltage of suitable magnitude and duration, it is possible to reduce the capacity of the capacitor. In the case of matrices of the capacitor type, in which coincident voltages are applied via column and row wires, it is generally important that the ratio of the voltage at which breakdowns occur with certainty, to the voltage at which breakdowns do not occur with certainty, remains below a certain value. Theoretically this value should be 3, but more appropriately for the present application the value should range between 1.5 and 2, as will be explained in detail hereinafter.

Such types of translators are suitable for employment as ordinary digital code translators in which, for example, by providing a coupling capacitor at an intersection, there is supposed to be effected a through connection from the row wire to the column wire, and also as storage matrices whose stored information is intended to be read out frequently. This type of translator is also of particular advantage in cases where known information items represented by combinations of signals applied to the column conductors are each to be assigned a corresponding meaning which is to be associated with the coincident application of a marking signal to a corresponding row conductor, as well as in cases where, subsequently to the feeding-in of unknown information items via the column conductors, the meanings of these information items are supposed to be indicated by the translation of a marking signal to the respective row. Accordingly, the translator, in conformity with the general idea of this invention, is first of all acted upon by information items in a row conductor-wise fashion, that is, the capacitors at the respective intersecting points are adjusted, by being burned out, to predetermined capacitance values, and may then be interrogated. Such types of translators may also be called learning matrices, because the translator is adjusted or set during a so-called "learning phase," and may be evaluated during so-called "learned phase." Since the invention is particularly suitable for employment with learning matrices, there will now follow a brief description of the properties of such learning matrices.

The matrix consists of a number of input columns $e_1 \ldots e_n$ and output rows $b_1 \ldots b_m$. At first the intersecting point coupling elements are unconditioned; that is, at first there are no preferred couplings between the column and row wires. The conditioning of the crosspoint elements (capacitors) is effected only during the learning phase by application of predetermined combinations of input information signals to the inputs $e_1 \ldots e_n$, and by coincident application of corresponding predetermined meaning signals to the row outputs $b_j$. The learning matrix is composed of elements of such type that the coupling between the input leads $e_i$ and the output leads $b_k$ can be varied in such a way during the learning phase that in the course of a later phase or stage, namely during the learned phase, upon application of the set of input information signals $\{e_j\}$, there is effected the marking of the associated output $b_j$. The learning process which is necessary to this end, may be performed either by a single or a repeated application of the input information coupled with simultaneous applications of marking signals at the associated output. Accordingly, the elements of the learning matrix may be of any type capable of varying in response to the offered information in the course of either one or several stages. The learning process may then be either reversible or irreversible. To this end a number of different types of crosspoint components could be employed; e.g. magnetic cores or electrochemical elements at the crosspoint. Another possible way is to employ electrically variable capacitors according to the present invention.

The column and row conductors are conveniently strip-shaped members which are evaporated onto a suitable base in the course of an evaporating process. Most appropriately the dielectric layer between the two planes of the conductors is also produced by an evaporating process. The cross-section of the conductors and the thickness of the dielectric layer or respectively the composition of the latter, are dependent, among other factors, upon the desired reduction in capacity which is to result from the burning-out processes, and upon the available supply voltages. In some cases it may also be of advantage to enlarge the coatings at the intersecting points in a suitable way, thus causing a separation between the effective capacitor coatings and the actual conductors. It is also possible to enhance this separation by making the conductors thick with respect to the capacitor coatings.

With respect to the learning matrices as described hereinbefore, it is mostly desirable to perform the storing of the input signals in a contradictory manner; to this end two conductors may be provided per column, so that each intersecting point will be provided with two capacitors. This type of embodiment of the translator calls for certain steps to be taken in direction of dimensioning the circuitry with respect to the input and the output side, as will be explained in detail hereinafter.

Fundamentally, the voltages employed for effecting the breakdowns, may be either D.C. voltages or A.C. voltages. Relative thereto another factor to consider is that the ratio of the voltage at which breakdown is unlikely to occur, to the voltage at which breakdown is likely to occur, providing the capacitance value has not dropped below a certain percentage of the original value, cannot be permitted to fall below a predetermined value due to the application of the coincident voltages to the columns and the rows. The burning-out of the capacitors, depending on the particular practical application, may be performed in either a single step, or in several steps. In the latter case it is possible to determine the maximum reduction in capacitance value which is supposed to be reached after a certain number of steps. When establishing the capacitance value in several small steps, in the case of a matrix employing two capacitors at each intersecting point, the difference in capacity between the two capacitors at each intersecting point may be regarded as a bit of information, thus providing the possibility of carrying out alterations with respect to the translation which, in the case of the learning matrix, means to imply that the matrix is capable of undergoing several "relearning" or reconditioning processes.

The novel type of translator may likewise be operated or, in the case of the learning matrix, be read-out, in response to either pulses or A.C. voltages. However, when using two capacitors per intersecting point, it is necessary to perform the read-out with an A.C. voltage. Since, most appropriately, the reading voltage is written-in via a transformer for the purpose of obtaining a low-ohmic input, and since the intersecting points contain capacitors which, if necessary, are supplemented by additional capacitors in order to obtain the energy necessary to effect the burning-out, it will be necessary that the resulting oscillating circuit be tuned to resonance with respect to the read-out frequency.

When using one capacitor per intersecting point the evaluation of the output signals can be effected in accordance with either magnitude "or" phase, whereas in cases where two capacitors are employed per intersecting point, the output signals can be evaluated in accordance with both magnitude "and" phase.

Figure 5:
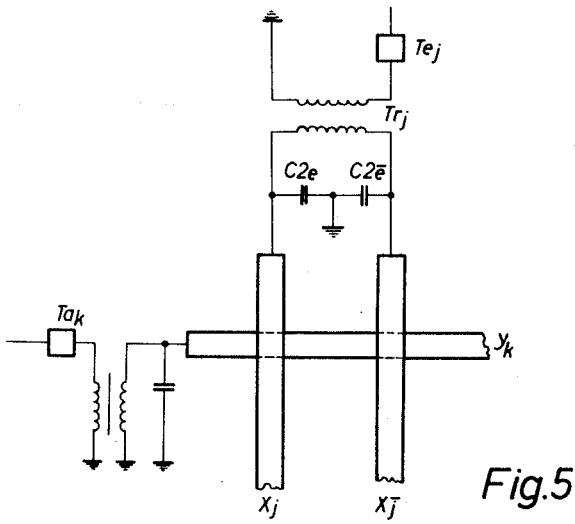

In the following the invention will now be explained in detail with reference to some examples of embodiment shown in FIGS. 1-5 of the accompanying drawings, in which:

FIG. 1 shows a simple type of embodiment of a capacitive translator according to the invention, a portion of which is viewed in cross-section in FIGURE 1a, FIG. 2 shows a capacitive translator incorporating means for separating the conductors from the capacitor coatings, FIG. 3 shows a capacitive learning matrix comprising two conductors per column, FIG. 4 shows an example relating to an input and an output circuit employed in cases where the capacitances are adjusted with the aid of D.C. voltages, and FIG. 5 shows an example relating to input and output circuits employed in cases where the burning-out is performed with the aid of A.C. voltages.

The translator according to the invention, in the most simple case, consists of the strip-shaped, parallel-extending column conductors $x_1 \ldots x_n$, and of the row conductors $y_1 \ldots y_m$ arranged perpendicular thereto. Between the plane of the column conductors and the plane of the row conductors there is arranged a uniformly thin dielectric layer. The whole matrix is arranged on a suitable base. The conductors as well as the dielectric may be produced by an evaporation process. Both the material and the thickness of the dielectric as well as of the conductors are chosen so that upon application of a voltage $U_1$ across the intersecting point $j_k$ between the conductors $x_j$ and $y_k$, there will occur flashovers (breakdowns by surface conduction), effecting a partial burning-out of the coatings and, consequently, a reduction of the capacity between the two conductors, whereas such flashovers are reliably avoided upon application of the voltage $U_0$. FIG. 1 shows such a simple type of arrangement of a translator.

Upon application of the suitable voltages of the $x$- and $y$-conductors, the burning-out first of all takes place at those points where the dielectric layer has a minimum thickness. The breakdown voltage increases as the capacity is reduced, that is, in accordance with the burning-out of the thin parts. By uniformly depositing the dielectric, it is possible to achieve a ratio of the voltage $U_1$, at which the first breakdown occurs, to the breakdown voltage required after the capacity has dropped on account of the burning-out to about 30% of the initial value, of approximately 1.

In the simple arrangement according to FIG. 1 it may now happen that one of the conductors, due to the burning-out processes, suffers a complete interruption, namely in those cases where the burned out parts are arranged or are lying next to each other in a linear succession as indicated by the line $a$ in FIG. 1. In order to avoid this, the thickness of one conductor on one part of the capacitor surface may be provided with a large cross-section, or else the dielectric layer may be correspondingly strengthened along a dimension parallel to the conductors. FIG. 1a shows a sectional view of an intersecting point, at which the cross-section of the $y$-conductor is correspondingly amplified in this way. The dielectric layer is indicated by the reference D. For preventing a complete interruption, the current conductors and the capacitor surfaces which are capable of being burned out, may by separated from each other.

FIG. 2 shows part of a matrix incorporating means for separating the matrix conductors from the capacitor plate coatings $K_x$ and $K_y$ between which the burning-out effect is exhibited. At the intersecting points of the conductors, the dielectric $D_1$ is enlarged, in order to keep the always remaining minimum capacity as small as possible. The matrix of FIG. 2 can be particularly well manufactured if both the conductors and the dielectric layer are produced by successive evaporating processes.

As a dielectric it is convenient to use inorganic substances which are capable of being evaporated, and which are insensitive to humidity, such as silicon monoxide, silicon dioxide, metallic oxides, and the like. By using silicon dioxide, and by providing a suitable layer thickness, it is possible to obtain values for $U_0$ on the order of 50 volts.

FIG. 3 shows part of a translator in which two $x$-conductors are provided for each intersecting point. The $x$-conductors may be arranged either in parallel next to each other, on the same side of the $y$ conductors, as in FIG. 3, or they may be arranged on opposite sides of the $y$-conductors, so that the capacitor coatings of the $y$-output conductors are respectively located between the two conductive coatings of the $x$ input lines. In the latter case, however, the arrangement has to be made in such a way that with respect to the coating of the $y$-line it can be achieved, by suitably selecting both the thickness and the material, that this coating is prevented from being burned out during the breakdowns.

The circuit arrangements which are necessary for effecting the writing-in of the information, are not shown in FIG. 3; it is merely shown that the read-out is to be effected with an alternating voltage of the same frequency and amplitude, but with an opposite phase. The opposite phase A.C. voltage signals are fed to the two respective $x$-conductors via the associated input switch T and the transformer $\ddot{U}_e$ in the manner as shown. For the read-out of the information, phase-sensitive rectifiers and, if necessary, amplitude discriminators are provided at the output leads $y_n$.

Basically, it is required that the input resistance as coming from the generator, as well as the output resistance with regard to the receiver, are low with respect to the resistance offered by the variable coupling capacity at the operating frequency. This is necessary in order to avoid unwanted multiple couplings. This is also the reason why a transformer $\ddot{U}_{a2}$ should be appropriately provided at the output leads.

Since the desired capacitances at the intersecting points are produced only by the electrical burning-out process, it is necessary to distinguish between the preparation or conditioning of the translator and its subsequent actual operation. If the burning-out processes are performed in the course of several stages, and if the interrogation is supposed to be performed in accordance with groups of input information, it is also possible to speak of a learning phase and of a learned phase. Prior to the learning phase the ratio between the final capacity must be determined and the initial capacity; in the utmost this ratio may amount to 0.3, because in the case of a higher ratio, the burning-out can no longer be achieved by way of a single coincidence. Thereupon, it is necessary to establish the ratio $U_{30\%}:U_0$; wherein $U_0$ is the voltage at which breakdowns (flashovers) are unlikely to occur, and $U_{30\%}$ is the breakdown voltage required after the capacity is reduced 30% by the burning-out. Prior to the beginning of the learning phase, the capacitances may all be equalized by a burning-out procedure, in that it is determined which capacity predominates, and by continuing the burning-out at the individual intersecting points until the output signal on the respective output lead has become zero.

The writing-in, that is, the burning-out of the intersecting points may be effected with the aid of direct voltage. This will now be explained with reference to FIG. 4, in which two capacitor coatings are shown to be provided per intersecting point. Relative thereto it is assumed that the row $b_k$ (conductor $y_k$) is connected, and that a signal is applied to the column $j$, that is, that in the case of binary signals the input $e_j$ is a "1," and the input $\overline{e_j}$ is a "0." This is supposed to reduce the capacity at the intersecting point $\overline{j_k}$, while the capacity at intersecting point $\overline{j_k}$ remains unchanged. To this end the voltage $+U_0$ is supplied to the conductor $x_j$ and the voltage $-U_0$ is supplied to the conductor $y_k$. For the duration of the breakdown time these voltages must be applied to the point of breakdown with a sufficiently low internal resistance, in order that sufficient energy will be available for the burning-out process. This may be effected in that the voltages are applied to the capacitor matrix via switches having low internal resistance. Such types of switches, however, are generally very expensive, especially when composed of active electronic components. However, these switches may be designed in a substantially more simple way if, in cases where the coatings have a sufficient capacitance value, the capacitor energy which is stored at the intersecting points themselves, is sufficient for ensuring in the case of a berakdown, a burning-out of a small portion of the coatitngs. In this case the direct voltage, for charging the capacitance, may be applied via the switches $Se_j$ or $\overline{Se_j}$; since this switch only has to handle a low output it consequently only involves a small expenditure. In case where this capacity is too small, there may still be provided the additional capacitors $C_{2e}$ or $\overline{C_{2e}}$, respectively.

If the ratio $U_{30\%}:U_0$ is greater than 2, but smaller than 3, then, in the described example, and for effecting the burning-out with the aid of direct voltage, the voltage $+U_0$ is applied to the conductor $x_j$, and the voltage $-U_0$ is applied to all other $x$-conductors; the voltage $-2U_0$ is applied to the conductor $y_k$, and all other $y$-conductors remain at the potential 0. At the intersecting point $j, k$ there is then applied the potential difference $3U_0$, whereas $U_0$ will prevail at all other intersecting points. If this ratio is greater than 3, a burning-out of individual coatings within the matrix can no longer be carried out by way of coincidence.

In the case of a double seizure of the intersecting points the read-out of the stored information is effected with the aid of an alternating voltage which is applied to the transformer $\ddot{U}e_j$ via the read-out circuit $Se_j$. The output signal on the line $y_k$ is transferred via the transformer $\ddot{U}a_k$ and the switch $La_k$ in the manner described hereinbefore with reference to FIG. 3. The transformers $\ddot{U}e_j$ and $\ddot{U}a_k$ may be generally wound in such a way that their leakage inductance will have the necessary value for tuning the additional capacitors $C_{2e}$ or $C_{2a}$ to resonance with respect to the read-out frequency, so that they will not cause a loss of power during the learned phase. If the inductances of the transformers are insufficient for this purpose, it is still possible to provide additional inductances $J_e$ or $\overline{J_e}$ at the input side.

The capacitors $C_{1e}$ and $C_{1a}$ serve to separate the respective portions of the circuit with respect to direct current. In the case of learning matrices an amplitude discriminator must still be provided in the output circuit of the learned phase.

In regard to matrices employing two capacitor coatings per intersecting point, it is also possible to cause breakdowns (flashovers) in such a way that alternating voltages of the same frequency and with a peak amplitude $U_0$ are applied to the $x$- and $y$-inputs. Then depending on the phase position (0° or 180°), breakdowns will be effected in one of the two coatings $j_k$ or $\overline{j_k}$ respectively. FIG. 5 shows a corresponding example of embodiment. When feeding-in the resonant frequency, that is, in the case of an adaptation of the transformer winding of the transformer $Trj$, and of the additional capacitances $C_{2e}$ or $\overline{C_{2e}}$, the power to be transferred by the switches will again be small and, consequently, the necessary expenditure will only be a low one. In this case, for the writing process, there may be used the same switches $Tej$ which are also used for the reading process, as may be taken from FIG. 5. The output circuit resembles that of FIG. 4, but also in this case the same switch $Ta_k$ can be used for effecting both the reading and the writing process.

It is often convenient to change at the same time, not only the capacity of one, but of several intersecting points. For example, with respect to the learning matrix, all input quantities may be applied in parallel, for changing in this way the capacitance value of one capacitor per double intersecting point of a row. In the writing phase this will impose the restriction that the writing gates of the $y$-coatings will have to have a resistance which is lower, e.g. by the factor of the number of the $x$-inputs, than that of the input gates.

The invention as disclosed herein has been described substantially in connection with a learning matrix. Without further ado, however, the invention may also be employed with all other electric translators. If the translation is already regarded as being appropriate after only a few parts of the capacitors at the intersecting points have been burned out, it is still possible to effect certain changes of the translation, if so required, by establishing each time a certain difference between the capacitances of the two capacitors of one intersecting point and the translation, until finally achieving the maximum possible reduction with respect to one capacitor.

While we have described above the principles of our invention in connection with specific apparatus, it is to

What is claimed is:

1. An electric translator of the matrix type comprising
    a matrix arrangement of intersecting row and column conductors,
    and a self-healing voltage variable coupling capacitor connected between each row and column wire at the intersection thereof, each said capacitor having a capacitance which may be permanently varied to one of a plurality of possible values by the application thereto of coincident row and column voltages of a given magnitude without destruction of the dielectric thereof, and which thereafter presents a correspondingly varied coupling impedance to signals translating between said row and column conductors via said capacitor.

2. An electric translator according to claim 1 wherein
    said conductors comprise strip-shaped film members, the intersecting areas of which define plates of said capacitors which are partially destroyed upon application of a breakdown potential across the respective capacitors, and wherein
    said row and column conductors are separated by a dielectric layer (D), which, in the intersecting regions of said conductors, represents the dielectric of the associated capacitors.

3. An electric translator according to claim 2 wherein at each intersection at least one of said film members is produced by evaporation upon a non-conducting base.

4. An electric translator according to claim 2 wherein said film members and said dielectric are all produced by evaporation upon a non-conducting base.

5. An electric translator according to claim 4 wherein said dielectric consists of an inorganic material which is insensitive to humidity.

6. An electric translator according to claim 5 wherein said inorganic material is an oxide of silicon.

7. An electric translator according to claim 2 wherein for the purpose of avoiding a complete line interruption during the application of conditioning potentials to said conductors, the intersecting portions of the said strip-shaped film members are enlarged in relation to the remaining portions of the said members.

8. An electric translator in accordance with claim 2 wherein
    for the purpose of avoiding a complete line interruption during the application of several conditioning potentials to the said intersecting conductors, the cross section of the said dielectric layer at the said intersecting regions of said film members is made larger than the cross section in the remainder of said dielectric layer.

9. An electric translator according to claim 1 wherein for the purpose of avoiding line interruptions the said conductors are extended in parallel to the said film members.

10. An electric translator according to claim 9 wherein intersecting conductors are respectively connected to large-surface capacitor coatings ($K_X$, $K_Y$) representing said film members and the thickness of the conductors is large in relation to that of the said capacitor coatings.

11. An electric translator according to claim 8 wherein the dielectric ($D_1$) is thickened at the points of intersection of the said conductors.

12. An electric translator according to claim 1 wherein:
    either said column or said row conductors are differentially interconnected in pairs for coupling bipolar signals of variable amplitude to the conductors perpendicular thereto; and wherein
    said differentially coupled conductors are disposed in a common plane.

13. An electric translator according to claim 12 wherein
    the thickness and composition at the plates of said capacitors are so selected that upon breakdown of a capacitor only those portions of the corresponding plates which are connected to both conductors of a given type (row or column) are burned out.

14. A translator according to claim 11 wherein said complementary conductors are closely spaced.

15. A translator according to claim 11 wherein said dielectric is so selected that the ratio of the voltage ($U_{30\%}$) at which breakdowns reliably appear until the capacitance value has dropped to less than 30% of the original value, to the voltage $U_0$ at which breakdowns are not reliably produced, is less than two.

16. A translator according to claim 15 wherein for the purpose of producing a breakdown a voltage ($U_0$) is applied to the conductor ($y_j$) at the crossing point ($j, k$).

17. A translator according to claim 16 wherein the dielectric is such that the ratio of the voltage ($U_{30\%}$) produced until the capacitance has dropped to less than 30% of the original value, to the voltage ($U_0$) at which breakdowns are not reliably produced, is less than 3.

18. A translator according to claim 16 wherein the voltage required to break down one of said capacitors is twice the absolute magnitude of the D.C. voltage applied to either of the corresponding conductors.

19. A translator according to claim 16 wherein for the purpose of connecting or applying D.C. voltages to the row and column conductors there are provided switches which are so connected across said intersections as to produce large currents from charges stored on said capacitors.

20. A translator according to claim 19 wherein additional storage capacitors are provided at the points of intersection so as to provide additional current for burning out portions of the plates of said capacitors to permanently vary the associated capacitance.

References Cited in the file of this patent

UNITED STATES PATENTS

| | | |
|---|---|---|
| 2,784,389 | Kelly | Mar. 5, 1957 |
| 3,028,659 | Chow et al. | Apr. 10, 1962 |

FOREIGN PATENTS

| | | |
|---|---|---|
| 853,069 | Great Britain | Nov. 2, 1960 |